United States Patent [19]

Seigneurin

[11] Patent Number: 4,612,184

[45] Date of Patent: Sep. 16, 1986

[54] HIGH SPECIFIC SURFACE HYDRARGILLITE

[75] Inventor: Laurent Seigneurin, Salindres, France

[73] Assignee: Rhone-Poulenc Specialites Chimiques, Courbevoie, France

[21] Appl. No.: 707,572

[22] Filed: Mar. 4, 1985

[30] Foreign Application Priority Data

Mar. 2, 1984 [FR] France .................. 84 03274

[51] Int. Cl.$^4$ .................................................. C01F 7/02
[52] U.S. Cl. .................................. 423/626; 423/625; 423/629
[58] Field of Search ........................ 423/625, 626, 629

[56] References Cited

U.S. PATENT DOCUMENTS

| | | | |
|---|---|---|---|
| 3,385,663 | 5/1968 | Hughes | 423/626 |
| 3,411,876 | 11/1968 | Michel et al. | 423/626 |
| 3,411,877 | 11/1968 | Michel et al. | 423/626 |
| 4,217,337 | 8/1980 | Yamada et al. | 423/626 |

FOREIGN PATENT DOCUMENTS

| | | | |
|---|---|---|---|
| 104798 | 8/1975 | Japan | 423/626 |
| 354717 | 1/1979 | U.S.S.R. | 423/626 |

*Primary Examiner*—H. T. Carter
*Attorney, Agent, or Firm*—Burns, Doane, Swecker & Mathis

[57] ABSTRACT

A high specific surface hydrargillite, well adopted as filler material or primer particulates in the production of finely divided aluminum trihydroxide by decomposition of Bayer process aluminate liquors, is readily prepared by (i) reacting an alkali metal aluminate with hydrofluoric acid at a temperature ranging from about 5° to 95° C., the amount of said hydrofluoric acid ranging from about 25% to 90% of that amount stoichiometrically required for complete neutralization of the alkalinity of said aluminate, (ii) optionally treating the hydrargillite precipitate which results at a temperature of from about 5° to 95° C. for from about one-half to 10 hours, and thence (iii) recovering said hydrargillite precipitate, preferably by filtering, washing and drying.

11 Claims, No Drawings

HIGH SPECIFIC SURFACE HYDRARGILLITE

BACKGROUND OF THE INVENTION

1. Field of the Invention

The present invention relates to the preparation of hydrargillite, and, more especially, to the preparation of hydrargillite having a high specific surface.

2. Description of the Prior Art

It is known to this art that neutralization of sodium aluminate with an acid results in the formation of amorphous or boehmitic-structure alumina (Kirk-Othmer). The acids which are employed generally and industrially are nitric acid, hydrochloric acid and sulfuric acid.

It too is known that, when hydrofluoric acid is reacted with sodium aluminate, cryolite $AlF_3 \cdot 3NaF$ and/or chiolite $AlF_3 \cdot 5/3NaF$ is/are thus formed.

SUMMARY OF THE INVENTION

It has now surprisingly been found, and which is a major object of the present invention, that by reacting hydrofluoric acid with sodium aluminate such as to neutralize only a fraction of the caustic soda in the said aluminate, a precipitate is obtained consisting essentially of hydrargillite. This product hydrargillite has a high specific surface and may be used as such or may, for example, be used as a primer in the preparation of very fine aluminum trihydroxide by decomposition of the aluminate liquors emanating from the Bayer process.

Briefly, the present invention features a process for the preparation of hydrargillite, comprising:

(i) reacting an alkali metal aluminate with hydrofluoric acid at a temperature ranging from 5 to 95° C., the amount of hydrofluoric acid employed ranging from 25% to 90% of that amount stoichiometrically required to completely neutralize the alkalinity of the aluminate;

(ii) optionally treating the hydrargillite precipitate which results at a temperature of from 5° to 95° C. for from one-half to 10 hours; and (iii) filtering the hydrargillite thus obtained, and thence washing and drying same.

DETAILED DESCRIPTION OF THE INVENTION

More particularly according to the present invention, the reactant sodium aluminate is preferably used at a concentration ranging from 0.05 mole/l to 1 mole/l and more preferably from 0.1 to 0.5 mole/l. Furthermore, the hydrofluoric acid is preferably employed in dilute form. Its concentration advantageously ranges from 5 g/l to 100 g/l and preferably from 10 g/l to 30 g/l.

The reaction resulting in the formation of the hydrargillite precipitate is preferably carried out by quickly pouring the hydrofluoric acid into the aluminate solution, under stirring at a temperature ranging from about 5° to 95° C. and preferably from 45° to 85° C.

The amount of hydrofluoric acid employed advantageously ranges from about 25% to 90% of that amount stoichiometrically required to completely neutralize the alkalinity of the aluminate; this amount preferably ranges from 50% to 80%. Below approximately 25% little hydrargillite is obtained and above 90% too high a proportion of cryolite is obtained.

The precipitate thus formed, which is consequently in a basic medium, is optionally treated or conditioned for approximately one-half hour to 10 hours, preferably for 2 to 5 hours, at a temperature ranging from 5 to 95° C. and preferably from 45° to 85° C. The precipitate is next filtered off, washed, dewatered and dried at a temperature ranging from 60° to 125° C. and preferably from 90° to 110° C.

Examination by X-ray and using a scanning electron microscope demonstrates that a product is obtained consisting of at least 60% by weight of finely divided hydrargillite and typically at least 90% by weight, the BET surface of which ranges from 1 to 100 $m^2/g$ and preferably from 10 to 100 $m^2/g$. The remainder of the product comprises material amorphous to X-rays or consisting of trace amounts of bayerite, cryolite or norstrandite.

The high surface area products are of particular interest because of their high specific surface, and consequently of their low crystallite size. These products may ultimately be used as a filler for paper or toothpaste, or may be used as a primer or primer modifier in the preparation of very fine aluminum hydroxide $Al(OH)_3$ by decomposition of Bayer process aluminate liquors.

According to the aforenoted priming process, the hydrargillite is introduced according to the invention into a Bayer liquor which is ready to be decomposed. Depending on the amount of hydrargillite added, after 24 or 48 hours precipitation of at least approximately 50% of the amount of alumina dissolved in the liquor is effected, in the form of an extremely finely divided aluminum trihydrate, the mean diameter of which can vary from about 0.2 to 1.7 microns.

In order to further illustrate the present invention and the advantages thereof, the following specific examples are given, it being understood that same are intended only as illustrative and in nowise limitative.

EXAMPLE 1

2,400 $cm^3$ of an aqueous sodium aluminate solution containing 1 mole of $Al_2O_3$ and 1.5 moles of $Na_2O$ were reacted, under vigorous stirring at 10° C., with 2,400 $cm^3$ of an aqueous solution of hydrofluoric acid at a concentration of 20 g/l, containing 2.4 moles of HF. The addition of HF was rapid, being completed in about 1 min. The amount of hydrofluoric acid employed corresponded to 80% of the amount required to completely neutralize the alkalinity of the aluminate. The temperature of the stirred mixture was maintained at 20° C. for 2 hours. The resultant precipitate was filtered off, then washed on a filter with 4 liters of water, and lastly dried at 60° C.; its weight after drying was 124 g (alumina yield: 79%).

X-ray examination evidenced the presence of finely divided, slightly crystallized hydrargillite having a BET surface area of 90 $m^2/g$.

EXAMPLE 2

2,500 $cm^3$ of a sodium aluminate solution containing 1 mole of $Al_2O_3$ and 1.5 mole of $Na_2O$ were reacted, under vigorous stirring at 35°–40° C., with 2,400 $cm^3$ of a solution of hydrofluoric acid at a concentration of 20 g/l and, at 35°–40° C., containing 2.4 moles of HF. Said amount of hydrofluoric acid was quickly added, over about 1 min, and corresponded to 80% of that amount required to completely neutralize the alkalinity of the aluminate. The temperature of the stirred mixture was maintained at 45° C. for 2 hours. The resultant precipitate was filtered off, then washed on a filter with 4 liters of water and lastly dried at 60° C.; its weight after drying was 126 g (yield of alumina: 81%).

X-ray examination evidenced the product to principally be hydrargillite (at least 90%), with trace amounts of bayerite and minimal trace amounts of nordstrandite. The BET surface area of this product was 48 m$^2$/g.

EXAMPLE 3

The procedure of Example 2 was repeated, except that the precipitation was carried out at 55° C. for 2 hours, the solutions being previously heated to about 40°-45° C. 130 g of product were obtained, corresponding to an alumina yield of 84%.

X-ray examination evidenced the product to principally be hydrargillite, with trace amounts of bayerite and trace amounts of nordstrandite. The BET surface area of this product was 41 m$^2$/g.

EXAMPLE 4

The procedure of Example 2, was repeated, except that the precipitation was carried out at 70° C., the solutions being previously heated to 60°-65° C. 128 g of product were bbtained, corresponding to a yield of alumina of 82%.

X-ray examination evidenced the product to principally be hydrargillite (at least 90%), with minimal trace amounts of bayerite and trace amounts of nordstrandite. The BET surface area of this product was 30 m$^2$/g.

EXAMPLE 5

The procedure of Example 2 was repeated, except that the precipitation was carried out at 83° C. for 2 hours, the solutions having been previously heated to 70°-75° C. 127 g of product were obtained, corresponding to a yield of alumina of 81.5%.

X-ray examination evidenced the product to principally be hydrargillite (at least 90%), with trace amounts of bayerite and of nordstrandite. The BET surface area of this product was 13 m$^2$/g.

EXAMPLE 6

2,500 cm$^3$ of a sodium aluminate solution containing 1 mole of Al$_2$O$_3$ and 1.5 mole of Na$_2$O were reacted, under vigorous stirring, with 2,500 cm$^3$ of a solution of hydrofluoric acid containing 1.8 moles of HF. The HF addition was carried out quickly, in about one minute. The amount of hydrofluoric acid employed corresponded to 60% of that amount required to completely neutralize the alkalinity of the aluminate. The temperature of the stirred mixture was maintained at 20°-25° C. for 2 hours. The resultant precipitate was filtered off, then washed on a filter with 4 liters of water and lastly dried at 60° C.; its weight after drying was 11 g (yield of alumina: 76%).

X-ray examination evidenced the product to be poorly crystallized hydrargillite (at least 90%) and a small fraction of bayerite. The product had a BET surface area of 66 m$^2$/g.

EXAMPLE 7

The procedure of Example 6 was repeated, except that the precipitation was carried out at 45° C. for 2 hours. 122 g of product were obtained, corresponding to a yield of alumina of 78%.

X-ray examination evidenced the product to be poorly crystallized hydrargillite (at least 90%) and a small fraction of bayerite. The product had BET surface area of 47 m$^2$/g.

The following examples describe the use of the hydrargillite obtained according to the invention as a primer in the preparation of very finely divided aluminum hydroxide by decomposition of Bayer process aluminate.

EXAMPLE 8

To 3 liters of aluminate liquor originating from the digestion of bauxite, after separation of the red mud by decantation, filtration and dilution (the composition of which liquor was: Al$_2$O$_3$=160 g/l, Na$_2$O=165 g/l, and which was heated to 50° C. and stirred), 1 liter of the same liquor was added, but which originally contained 90% of that amount of hydrofluoric acid required for complete neutralization, and which HF was well suspended/dispersed therein such that a primer consisting of 10 g of hydrargillite, calculated as Al$_2$O$_3$, had precipitated therein, at 70° C. The amount of primer employed corresponded to 1.4% of Al$_2$O$_3$ relative to the Al$_2$O$_3$ in the liquor. The BET surface area of the primer was 30 m$^2$/g.

After 24 hours of decomposition at 50° C., filtration, washing and drying at 100° C., 554 g of a product consisting essentially of hydrargillite and containing but trace amounts of bayerite were obtained.

The BET surface area of the product hydrargillite was 8 m$^2$/g. The particle size distribution was such that the mean particle diameter was 0.8 microns, 100% of the particles having a diameter below 2 microns and 0% below 0.3 microns.

EXAMPLE 9

A procedure similar to that of Example 8 was carried out, but using 10 g of hydrargillite, calculated as Al$_2$O$_3$ (which had precipitated in the added liquor at 45° C. using 80% of the stoichiometrically required hydrofluoric acid) as a primer in this Example. The amount of primer employed corresponded to 1.4% of Al$_2$O$_3$ relative to the Al$_2$O$_3$ in the liquor. The BET surface area of the primer was 48 m$^2$/g.

After 24 hours of decomposition at 50° C., filtration, washing and drying at 100° C., 576 g of a product consisting essentially of hydrargillite and containing but trace amounts of bayerite were obtained.

The BET surface area of this hydrargillite was 12 m$^2$/g; its particle size distribution was such that the mean particle diameter was 0.5 micron, 91% of the particles having a diameter below 2 microns and 15% below 0.3 micron.

EXAMPLE 10

A procedure similar to that of Example 8 was carried out, using an alumina liquor from the same origin as that in Example 8, but having the composition: Al$_2$O$_3$=160 g/l, Na$_2$O=170 g/l.

10 g of hydrargillite, calculated as Al$_2$O$_3$, precipitated at 20° C. using 80% of the stoichiometrically required hydrofluoric acid, were employed as the primer in this Example. The amount of primer corresponded to 1.4% of Al$_2$O$_3$ relative to the Al$_2$O$_3$ of the liquor. The BET surface area of the primer was 90 m$^2$/g.

After 24 hours of decomposition at 50° C., filtration, washing and drying at 100° C., a product consisting entirely of hydrargillite having a BET surface area of 15 m$^2$/g was obtained. The particle size distribution was such that the mean particle diameter was 0.4 micron, 95% having a diameter below 2 microns and 28% a diameter below 0.3 micron.

EXAMPLE 11

A procedure similar to that of Example 8 was carried out, but using the same alumina liquor as that employed in Example 10.

In this Example, 10 g of hydrargillite, calculated as $Al_2O_3$, precipitated at 83° C. using 80% of the stoichiometrically required hydrofluoric acid, were used as the primer. The amount of primer corresponded to 1.4% of $Al_2O_3$ relative to the $Al_2O_3$ in the liquor. The BET surface area of the primer was 13 $m^2/g$.

After 24 hours of decomposition at 50° C., filtration, washing and drying at 100° C., a product consisting of hydrargillite and containing but trace amounts of bayerite was obtained. The product had a BET surface area of 6 $m^2/g$. Its particle size distribution was such that the mean particle diameter was 1.7 micron, 65% having a diameter below 2 microns and 0% below 0.3 micron.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of high specific surface hydrargillite, comprising (i) reacting an alkali metal aluminate with hydrofluoric acid at a temperature ranging from about 5° to 95° C., the amount of said hydrofluoric acid ranging from about 25% to 90% of that amount stoichiometrically required for complete neutralization of the alkalinity of said aluminate, (ii) treating the hydrargillite precipitate which results at a temperature of from about 5° to 95° C. for up to about 10 hours, and thence (iii) recovering said hydrargillite precipitate.

2. The process as defined by claim 1, comprising (iii) recovering said hydrargillite precipitate by filtering, washing and drying same.

3. The process as defined by claim 1, said alkali metal aluminate comprising an about 0.05 mole/liter to 1 mole/liter solution thereof.

4. The process as defined by claim 3, said alkali metal aluminate comprising an about 0.1 mole/liter to 0.5 mole/liter solution thereof.

5. The process as defined by claim 3, said hydrofluoric acid comprising an about 5 gram/liter to 100 gram/liter solution thereof.

6. The process as defined by claim 5, said hydrofluoric acid comprising an about 10 gram/liter to 30 gram/liter solution thereof.

7. The process as defined by claim 1, the amount of hydrofluoric acid ranging from about 50% to 80% of that amount stoichiometrically required.

8. The process as defined by claim 1, said temperature of reaction ranging from about 45° to 85° C.

9. The process as defined by claim 2, said drying being carried out at a temperature of from about 60° to 125° C.

10. The process as defined by claim 1, wherein said step (i) reaction is carried out by adding the hydrofluoric acid to the alkali metal aluminate over a period of time on the order of one minute or less.

11. The process as defined by claim 1, comprising (ii) treating the hydrargillite precipitate which results at a temperature of from about 5° to 95° C. for from about one-half to 10 hours.

* * * * *